Aug. 27, 1957     T. K. KEHLER     2,804,090
ANNULAR VALVE WITH SPRING-SUPPORTED DAMPING PLATE
Filed Aug. 30, 1954
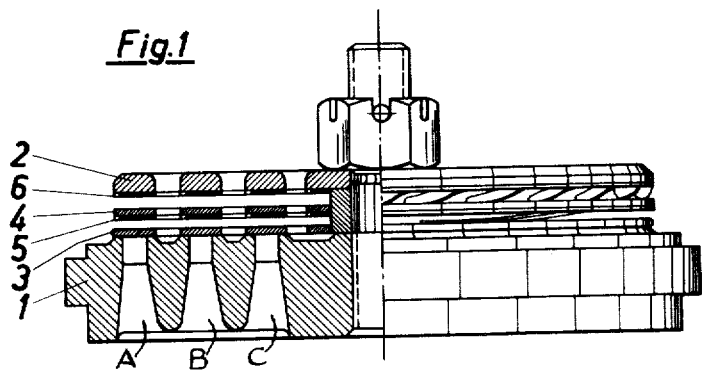
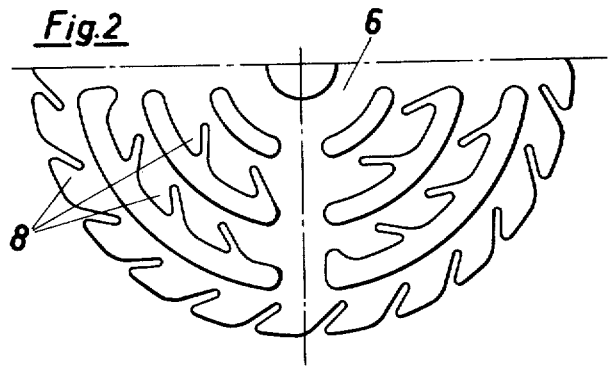
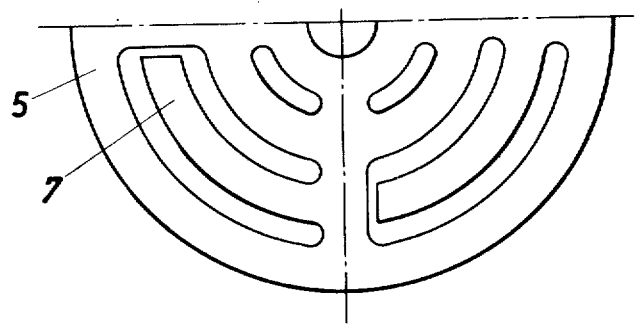
INVENTOR
THEODOR K. KEHLER

United States Patent Office 2,804,090
Patented Aug. 27, 1957

2,804,090

ANNULAR VALVE WITH SPRING-SUPPORTED DAMPING PLATE

Theodor Karl Kehler, Vienna, Austria, assignor to Hoerbiger & Co., Vienna, Austria Application August 30, 1954, Serial No. 452,889

Claims priority, application Austria September 5, 1953

5 Claims. (Cl. 137—516.13)

This invention relates to an annular valve with a spring-supported damping plate. Annular or ring valves are already known in which a damping plate is held between a valve closure plate and a valve stop plate and has the object of reducing the opening impact of the valve closure plate against the stop plate by absorbing in its mass some of the kinetic energy of the closure plate. In the resting or closed position of such a valve, the damping plate is held by springs in a position approximately half-way between the valve closure plate, supported on the valve seating, and the valve stop plate. These springs may, for instance, be of helical type, bearing with their ends on both sides of the damping plate and on the closure plate and stop plate. An alternative way of resiliently supporting the damping plate consists in suitably cutting through the ring portions thereof and bending up the cut ends to form springs, so that the damper plate, being essentially of the same form or shape as the valve or closure plate, is itself made to act as a spring plate, the spring arms of which bear against the closure plate and the stop plate respectively. By suitably selecting the strength of the spiral springs or spring arms, it is possible to obtain a yielding bearing for the damping plate on the closure plate, and a resistant bearing therefor on the stop plate. This arrangement is essential for the reason that when the closure plate lifts, the damping plate is in the first instance required to remain at rest so that when the closure plate has come in contact with the damping plate, both are able to rise with suitable retardation, until contact is made with the stop plate.

The damping plate may either be guided in its movement by sliding on a guide ring, or by separate guide links. In the latter case, the axially acting guide linkage will embody the spring means urging the damping plate up towards the stop plate.

Such forms of spring support of the damping plate, in particular those in which it is supported against the valve stop plate, have the disadvantage in common, namely, that the force of the springs is applied at relatively few points on the damping plate, which force owing to the insufficient, inherent rigidity of the damping plate, gives rise to undesirable deformations. The fitting of helical springs in and to the valve stop plate complicates the construction and arrangement of the latter, owing to the necessity for the provision of special spring sockets thereon. On the other hand, in the design of the damping plate with bent-up spring arms or blades of constant cross section, such spring blades experience excessive bending stresses at their roots or fixed ends, leading frequently to fractures in service: in which case, the whole damping plate becomes useless.

According to the present invention in an annular or ring valve, in particular a compressor valve, with a number of annular openings or ports, the damping plate is supported against the valve stop plate by tongued or bladed spring-plate means, such tongued spring-plate or disc means being of essentially the same form or shape as the valve closure plate. Slits opening from the ring edges of the damping plate form an acute angle with the tangent to their point of origin and extends to a specified diameter within each ring to subdivide the individual rings peripherally into tongues or blades which are bent outwards from the plane of the plate and form leaf springs all of approximately equal strength. The resulting plurality of spring tongues or blades enables an exceptionally effect utilization of the spring plate material.

By superposition of a number of identical spring plates with spring blades bent outwards in the same direction, and if desired also by variously bending the individual tongues or blades of each plate, the spring characteristic or resilient properties of the individual spring plates or of an assembly of such spring plates can be varied and controlled within wide limits.

The resilient element between the damping plate and the valve closure plate may suitably be constituted by a very weak spring plate of old or known type with a small number of long spring blades, or by a very thin, tongued spring-plate.

The principal advantage of the use of tongued spring-plates as resilient, damping-plate support means is that owing to the plurality of spring blades, there is very uniform loading of the damping plate, which loading is distributed over the individual rings of the damping plate approximately proportionally to the mean load on the corresponding rings of the valve carried plate. This leads to a minimum deformation of the valve closure and damping plates when striking against the stop plate, and consequently decreased risk of fracture of these parts of the valve.

An embodiment of the invention will now be described by way of example with reference to the accompanying drawing in which:

Figure 1 is an elevational view, partly in section, through a valve according to this invention;

Figure 2 is a plan view of one half of the tongued spring plate; and

Figure 3 is a plan view of one half of a spring plate employed in the valve structure.

Referring now more specifically to Fig. 1, it shows an assembled valve comprising a seating member 1 provided with three radially spaced annular slots or ports A, B and C, a valve stop plate 2, a valve carrier plate 3, a damping plate 4, a spring plate 5 and a tongued spring plate 6. The spring plate 5 is shown in Fig. 3 as being provided with spring arms or leaves 7, while the tongued spring plate 6 is shown in Fig. 2 as being provided with short spring blades 8.

Under the action of the fluid conveyed, the valve carrier plate 3 is lifted from the valve seat 1 towards the valve stop plate 2. In doing so, it exercises pressure on the spring member arranged between the valve plate 3 and damping plate 4, i. e., on the normal spring plate 5. Owing to the soft characteristic of spring plate 5, the valve plate 3 reaches the damping plate 4 before the same has been lifted by a substantial amount. During the impact of the valve plate 3 on the damping plate 4, a major part of the kinetic energy is consumed by the mass of the damping plate 4, whereby the valve plate 3 now engaging the damping plate 4 is highly retarded. Only now does the action of the tongued spring plate 6 begin. The valve plate 3, normal spring plate 5 and damping plate 4 move jointly and highly retarded towards the stop plate 2. Just that intensive damping effected by the provision of a spring member having a rigid characteristic between the damping plate 4 and the stop plate 2 has been clearly pronounced and defined by this invention.

Although a certain specific embodiment of the invention has been shown and described, it is obvious that many modifications thereof are possible. The invention, therefore, is not to be restricted except in so far as is necessi-

I claim:

1. An annular compressor valve comprising a seating member with a plurality of radially and circumferentially spaced arcuate ports therein, a closure plate on the seating and having a plurality of radially and circumferentially spaced arcuate slots therein defining concentric closure rings coincident with said arcuate ports of said seating member for closing said ports, a stop plate for limiting opening movement of the closure plate, and a damping plate slotted similarly to the closure plate and supported between the closure plate and the stop plate by spring means, said spring means comprising a spring plate slotted similarly to the closure plate and bearing against one of said plates, said spring plate having resilient tongues formed on concentric rings thereof and bearing against the other of said plates.

2. An annular compressor valve according to claim 1, wherein the resilient tongues of said spring plate comprise a series of resilient tongues peripherally spaced around each concentric ring.

3. An annular compressor valve according to claim 2, wherein each series of tongues is defined by a series of slits each extending inwards from the ring edge at an acute angle with the tangent to its point of origin, and the interslit material of the ring is bent outwards from the plane of the ring to form the series of resilient tongues.

4. An annular valve comprising a ported valve seating member, a valve closure plate on the seating member, a stop plate for limiting opening movement of the closure plate, a damping plate between the closure plate and the stop plate, and tongued spring plate means between the stop plate and the damping plate, said tongued spring plate means bearing against one of said latter plates with the tongues thereof bearing against the other of said latter plates and supporting the damping plate against the stop plate.

5. An annular valve as set forth in claim 4 including a spring bladed plate means between said damping plate and said valve closure plate and bearing against one of said latter plates with the spring blades thereof bearing against the other of said latter plates to support the damping plate against the valve closure plate.

References Cited in the file of this patent

UNITED STATES PATENTS

| | | |
|---|---|---|
| 1,324,137 | Wikander | Dec. 9, 1919 |
| 1,971,171 | Bebbington | Aug. 21, 1934 |
| 2,186,489 | Kehler | Jan. 9, 1940 |
| 2,604,296 | Kehler | July 22, 1952 |

FOREIGN PATENTS

| | | |
|---|---|---|
| 25,690 | Great Britain | of 1910 |